UNITED STATES PATENT OFFICE.

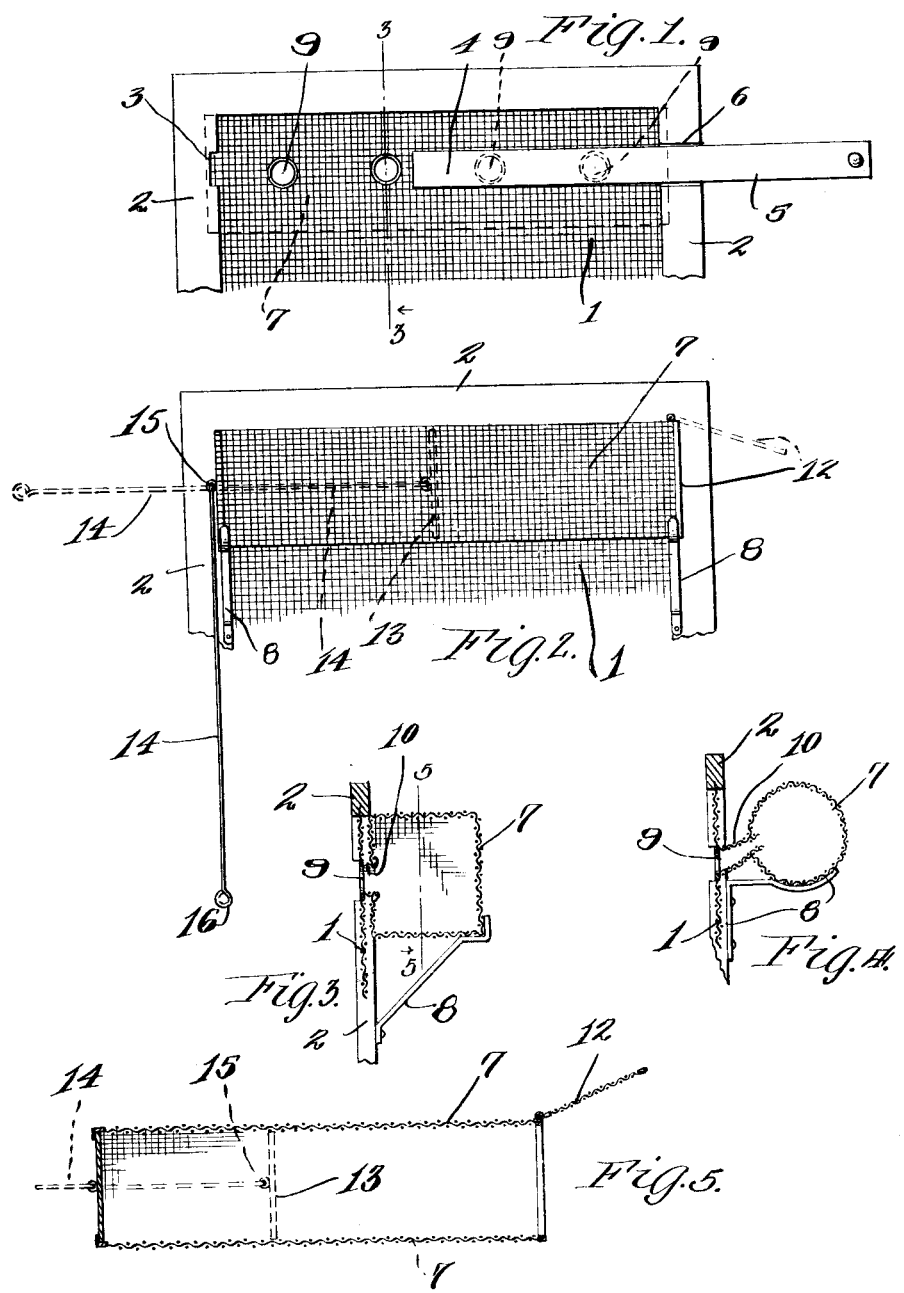
J. A. CRUTTENDEN.
FLY TRAP.
APPLICATION FILED DEC. 12, 1912
1,108,711. Patented Aug. 25, 1914.

JAMES A. CRUTTENDEN, OF RAMIRENA, TEXAS.

FLY-TRAP.

1,108,711. Specification of Letters Patent. Patented Aug. 25, 1914.

Application filed December 12, 1912. Serial No. 736,357.

*To all whom it may concern:*

Be it known that I, JAMES A. CRUTTENDEN, a citizen of the United States, residing at Ramirena, in the county of Live Oak and State of Texas, have invented new and useful Improvements in Fly-Traps, of which the following is a specification.

This invention relates to traps, and more particularly to a fly trap which is adapted to catch the flies, before the same enter a house.

An object of the invention is to provide a simple, inexpensive means for catching flies, especially the numerous ones which congregate on the outer side of a screen endeavoring to get into the house, and a trap which is adapted to be used in connection with the screen or screen door, for this purpose.

Another object of this invention is the provision of a rectangular fly trap preferably constructed of screen wire which is removably supported against the inner side of a screen, by brackets which are carried by the screen, in such a manner that flies congregated upon the outer side of the screen may enter the trap through openings which are provided for this purpose. The trap is further provided with a member slidably mounted therein, by means of which the flies may be forced out of the trap through the door-way into a suitable receptacle for killing them.

With the foregoing and other objects in view, the invention consists in certain details of construction, combination and arrangement of parts, as will be hereinafter more fully described, shown in the drawings, and claimed.
In describing the invention in detail, reference will be had to the drawings, wherein like characters designate like or corresponding parts in the several views, and in which, Figure 1 is an elevation view looking at the exterior of a window. Fig. 2 is an elevation view of the opposite side of the trap shown in Fig. 1. Fig. 3 is a view on the line 3—3 of Fig. 1. Fig. 4 is a detail, sectional view of a modified form of trap. Fig. 5 is a view taken on the line 5—5 of Fig. 3 and showing the door of the trap open.

In the drawings, 1 denotes an ordinary window screen, the frame 2 of which has a cut-out portion 3 on one side thereof adapted to receive the end 4 of a board or strip 5 which is slidably mounted in a groove 6 on the other side of the frame 2.

The trap proper, which is designated by the numeral 7, made preferably of screen wire, but any suitable material may be used, is mounted on the brackets 8 which are secured to the screen frame 2, by any suitable means, and extends into the interior of the house. The screen 1 is provided with openings 9, which are surrounded by a suitable binding, to prevent the wires from raveling, having leadways 10 communicating between them and the interior of the trap 7. A door 12, hingedly connected to the upper side of the trap, is provided. Mounted within the trap is a member 13, which has a bar or strong piece of wire 14 swivelly connected thereto, as is shown at 15. This member 13 is provided for the purpose of forcing the flies out of the trap 7, by means of the door 12, into a fire or any suitable means for destroying them and is of a contour substantially similar to the inner surface of the trap and has the side edges thereof arranged in close relation with the inner surface of the trap so that when normally positioned in the opposite end of the trap from which the door is disposed it coöperates with the door and aids in the maintenance of the shape of the trap. The bar 14 is swivelly connected to the member 13 so that when the said member is at the opposite end of the trap from the door, it may hang down, out of the way, as is shown in solid lines in Fig. 2 of the drawings. A ring or knob 16 is formed upon the end of the bar 14 to aid the operator in maintaining a firm hold upon the same.

When the trap is in operation, the board or strip 5 is removed and the holes 9 are exposed; the flies coming to settle on the screen, find these openings and desiring to get into the house, pass therethrough. Once inside the trap they will cling to the sides thereof in the same manner as they cling to a screen. When it is desired to destroy the flies and empty the trap, a strip 5 is inserted in the groove 6 and slid over the holes 9, thereby closing them, and the end 4 is inserted into the cut-out portion 3. This securely closes all exit to the trap. Then the trap 7 may be removed from the brackets 8 and any desirable means used to destroy the flies; they may be killed in the trap, forced out of the trap by means of the member 13, into some other suitable receptacle, or one of many other desirable ways of exterminating them may be employed.

In Fig. 4 is shown a trap circular in shape, but in all other respects similar to the one shown in the other views. While these two forms are the only shown, applicant desires it to be understood that he may use any desired shape of trap and is not to be limited to any one specific shape. It will be noted that the brackets conforming to the desired shape of the trap, aid in the maintenance of the shape of the trap and prevent undue movement of the same.

In practical fields certain minor features of construction, combination, and arrangement of parts may necessitate alterations to which the patentee is entitled, provided the alterations are comprehended within the scope of what is claimed.

Having thus described the invention, what is claimed as new and useful is:

1. In a fly trap, a screen, a fly trap constructed of screen wire disposed upon the inner side of said screen, said screen provided with openings surrounded by binding means adapted to communicate with openings in said trap whereby the flies may pass through the screen into said trap, means for retaining the flies within said trap, a doorway in said trap and a member disposed within said trap having a bar pivotally connected thereto adapted to force the flies out of the trap through said doorway.

2. In a fly trap, a screen, a fly trap constructed of screen wire disposed upon the inner side of said screen, said screen provided with openings surrounded by a binding means for communication with openings in said trap for allowing flies to pass through said screen into said trap, means for retaining the flies within the trap, a door-way in one end of said trap, a member normally disposed in the opposite end of said trap conforming to the inner surface of the trap and arranged in close relation with the sides thereof for coöperating with the doorway in aiding the maintenance of the shape of the trap, and a bar pivotally connected to said member for sliding said member toward said door-way for forcing the flies out of the trap through the door-way.

JAMES A. CRUTTENDEN.

Witnesses:
R. J. BRADFORD,
S. M. DOBIE.

Copies of this patent may be obtained for five cents each, by addressing the "Commissioner of Patents, Washington, D. C."